3 Sheets--Sheet 1.

L. P. HOYT.
Expansion Gearings.

No. 147,398. Patented Feb. 10, 1874.

Fig. I.

Witnesses:
Jas. E. Hutchinson
John R. Young

Inventor
L. P. Hoyt, by
Prindle and Dean, his
Attorneys.

3 Sheets--Sheet 3.

L. P. HOYT.
Expansion Gearings.

No. 147,398. Patented Feb. 10, 1874.

WITNESSES:
Jas. E. Hutchinson
John R. Young

INVENTOR.
L. P. Hoyt, by
Prindle and Deane, his
Attorneys

UNITED STATES PATENT OFFICE.

LUCIUS P. HOYT, OF AURORA, ILLINOIS, ASSIGNOR TO HOYT & BROTHER MANUFACTURING COMPANY, OF SAME PLACE.

IMPROVEMENT IN EXPANSION-GEARINGS.

Specification forming part of Letters Patent No. 147,398, dated February 10, 1874; application filed October 14, 1873.

*To all whom it may concern:*

Be it known that I, LUCIUS P. HOYT, of Aurora, in the county of Kane and in the State of Illinois, have invented certain new and useful Improvements in Expansion-Gearing; and do hereby declare that the following is a full, clear, and exact description thereof, reference being had to the accompanying drawings making a part of this specification, in which—

Figure 1:
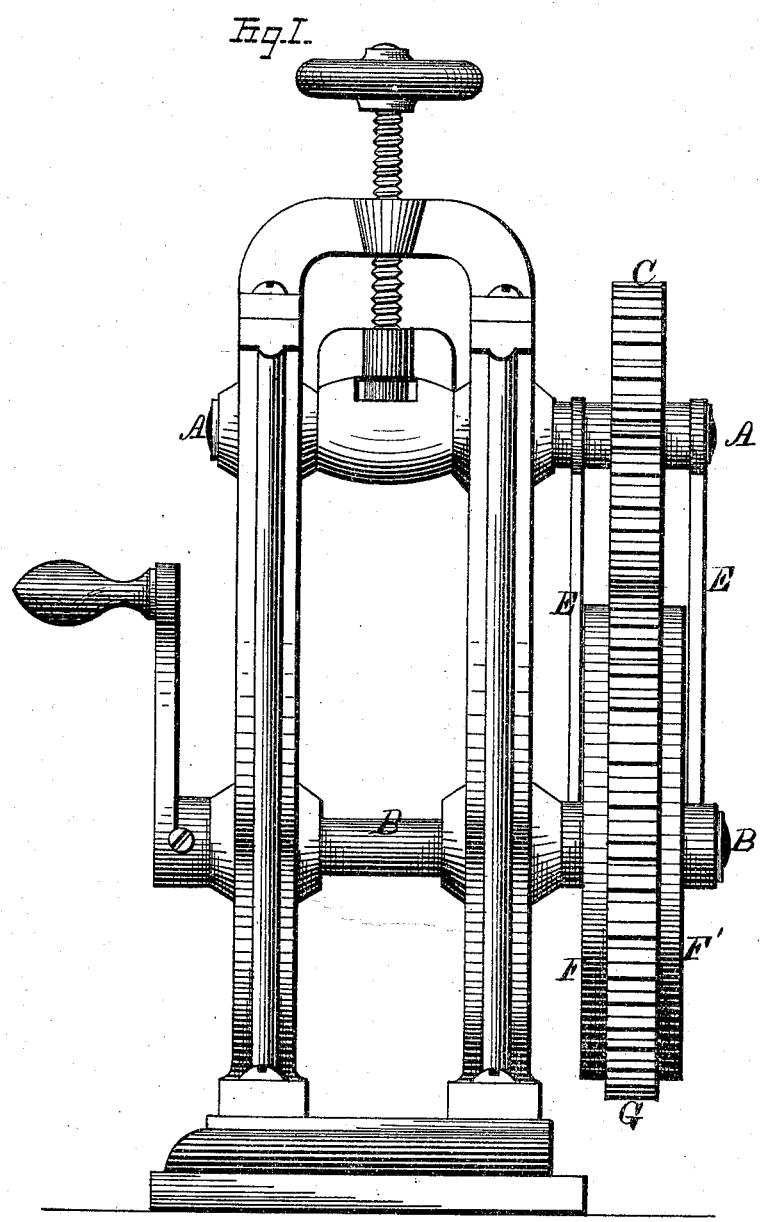
Figure 2:
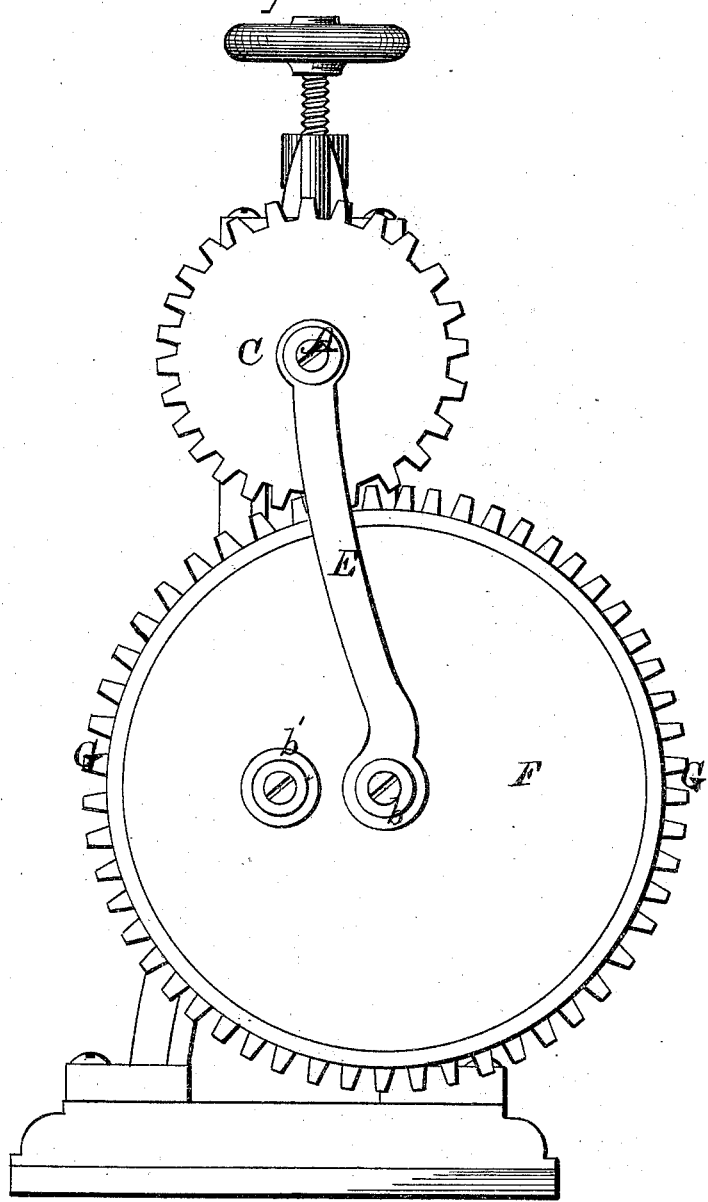
Figure 3:
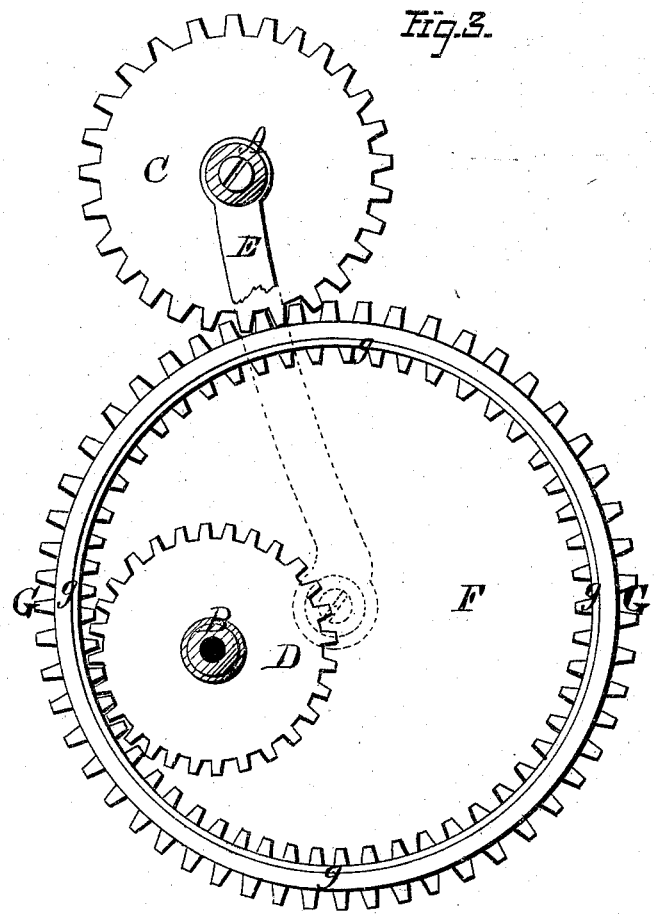
Figure 4:
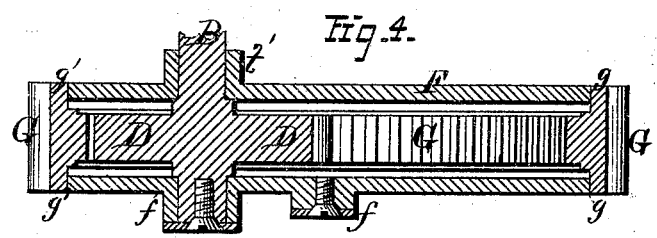

Figure 1 is a front elevation of my improved gearing. Fig. 2 is a side elevation of the same. Fig. 3 is a like view of said gearing with one of the bearing-plates of the eccentrically-pivoted gear removed, and Fig. 4 is a section of said gear upon line $x\ x$ of Figs. 1, 2, and 3.

Letters of like name and kind refer to like parts in each of the figures.

The object of my invention is to enable parallel rollers or shafts to be geared together in such a manner as to permit of their adjustment toward or from each other without interference with the said gearing; and it consists, principally, in an internally and externally toothed rim or ring, journaled upon a suitable support and combined with an internal and an external pinion, in the manner and for the purpose substantially as is hereinafter specified. It consists, further, in the eccentrically-journaled plates, which form bearings for, and are combined with, the toothed rim or ring, substantially as and for the purpose hereinafter shown. It consists, finally, in the construction and combination of the toothed ring, pinions, bearing-plates, and hangers with their shafts, in the manner and for the purpose substantially as is hereinafter set forth.

In the annexed drawings, A and B represent two shafts, suitably journaled in parallel lines within supports, and made adjustable toward or from each other. Upon the end of each shaft A and B is secured a toothed pinion, C and D, respectively, which have a like number of teeth, but are not of the same dimensions, the lower of said pinions D being about seven-eighths the diameter of said upper pinion, C. From the upper shaft A, upon each side of the pinion C, is pivoted one end of a hanger, E, which extends downward and outward, and has its opposite end pivoted in a like manner to or upon a hub or boss, $f$, that is placed at the center upon one side of a circular disk, F, each of said hangers being thus attached to a disk, and such points of attachment being upon the outer sides of the same, so as to leave the inner or adjacent sides of said disks plane and unobstructed. Upon and between the disks F is placed an annular rim or ring, G, which is toothed upon its inner and outer peripheries, and is provided upon or within each side with a right-angled groove, $g$, that embraces a portion of the inner face and the whole of the periphery of the corresponding disk, which latter, thereby, in connection with the opposite disk, forms a bearing for and upon which said ring may revolve. The lower shaft B passes through a suitable bearing, $f'$, in each disk, F, which bearings are placed eccentrically at such radial points as to cause the pinion D to mesh with the internal teeth of the rim G, while the lengths of the hangers are such as to cause the outer series of teeth upon said rim to mesh with the upper pinion C.

As thus constructed and combined, the operation of the gearing is as follows: Upon turning the lower shaft B its pinion D will rotate the rim G upon its bearing-plates or disks F, by which movement the pinion C and shaft A will be rotated in an opposite direction, but with the same velocity as the said lower shaft and its pinion.

It will be seen that the adjustment of the shafts toward or from each other does not change the relative radial position of any of the interlocking or meshing teeth, the distance between the centers of motion of the upper pinion and the toothed rim being maintained by means of the hangers, while the bearing-disks of said toothed rim are pivoted upon the shaft of the lower pinion, and at all times preserve the relative radial positions of the contiguous portions of the peripheries of said parts.

As the space between the bearing-disks is unobstructed an internal pinion, having any relative size that will admit of its operation, may be used within the toothed rim, by which means the relative velocities of the shafts can be varied to suit the occasion.

In addition to the advantage named much larger and stronger pinions can be employed than would be practicable if the central bearing of the external and internal gear extended from side to side, while the employment of two bearing-disks effectually supports said gear from or upon either side, and materially increases its strength and durability.

Having thus fully set forth the nature and merits of my invention, what I claim as new, is—

1. An internally and externally toothed rim or ring, journaled upon supports and combined with an internal and an external pinion, substantially as and for the purpose specified.

2. In combination with the toothed rim or ring G, the eccentrically-journaled disks F, fitted into the grooves $g$ of said rim or ring and furnishing a bearing for and upon which the same revolves, substantially as and for the purpose shown.

3. The toothed rim G, bearing plates or disks F, hangers E, pinions C and D, when constructed, as shown, and combined with each other and with the shafts A and B, in the manner, and for the purpose substantially as shown.

In testimony that I claim the foregoing I have hereunto set my hand this 3d day of October, 1873.

LUCIUS P. HOYT.

Witnesses:
F. A. BEHER,
ISAAC L. HILT.